Figure 25:
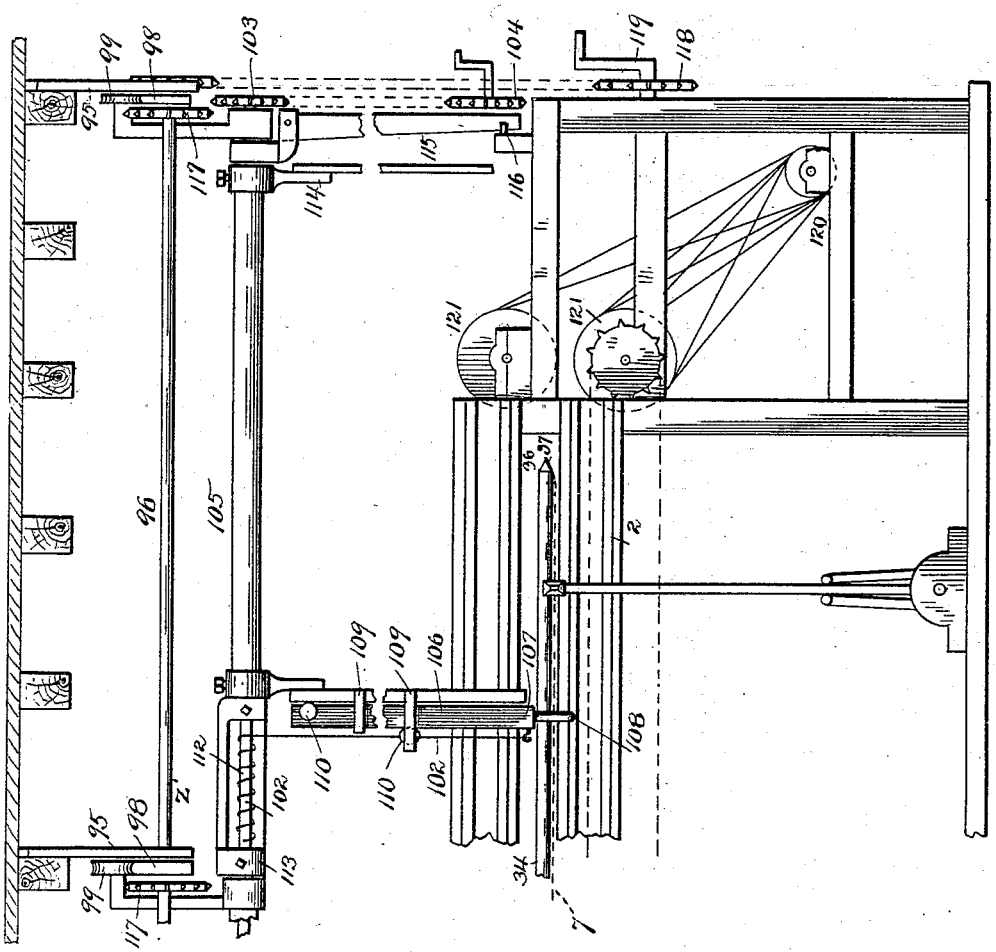

(No Model.) 8 Sheets—Sheet 1.
B. HERSHEY.
HOSE MACHINE.
No. 440,033. Patented Nov. 4, 1890.
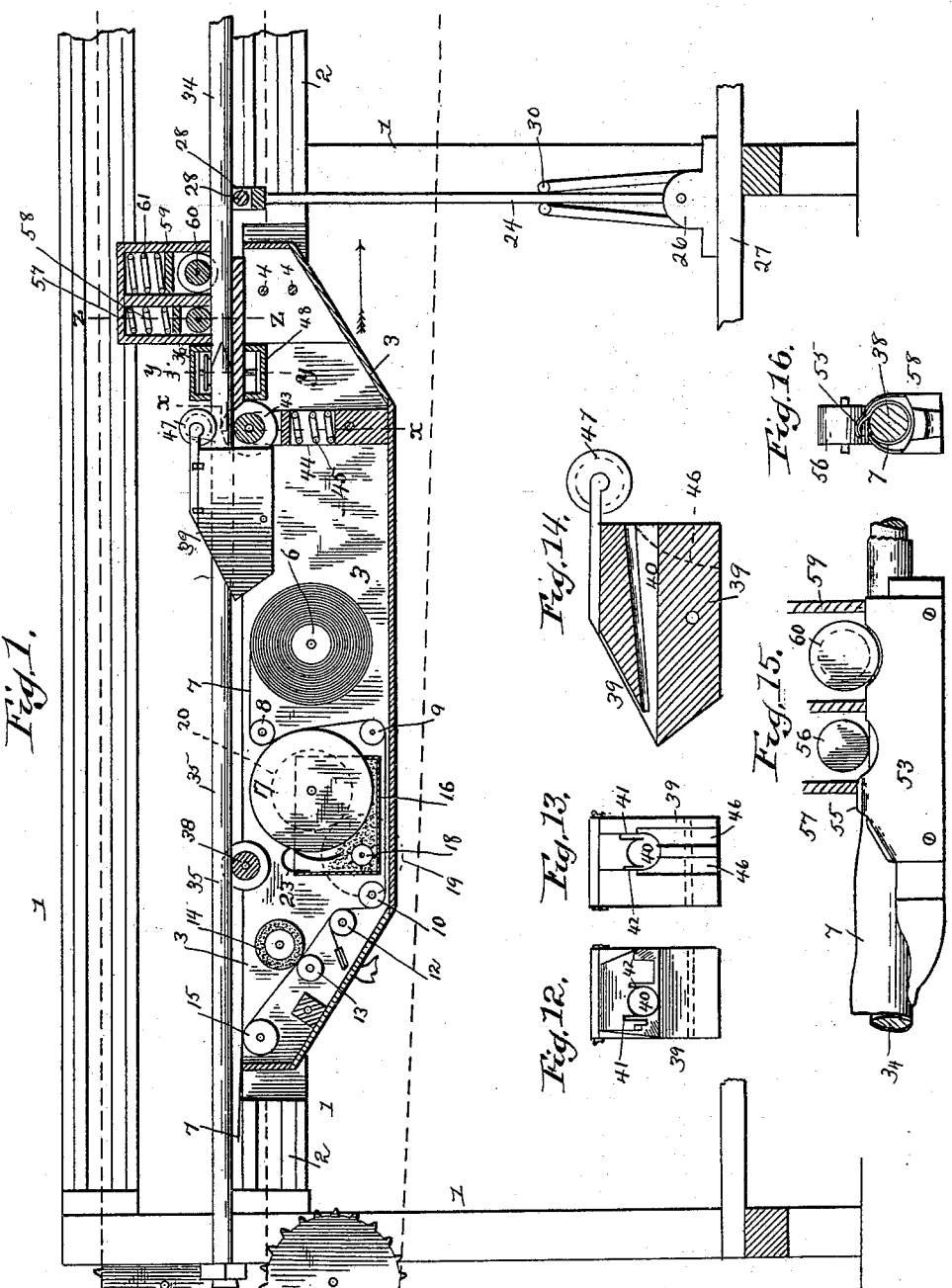
Witnesses
Ira R. Steward.
J. G. Meyers Jr.
Inventor
Benjamin Hershey.
By his Attorney
James L. Norris.

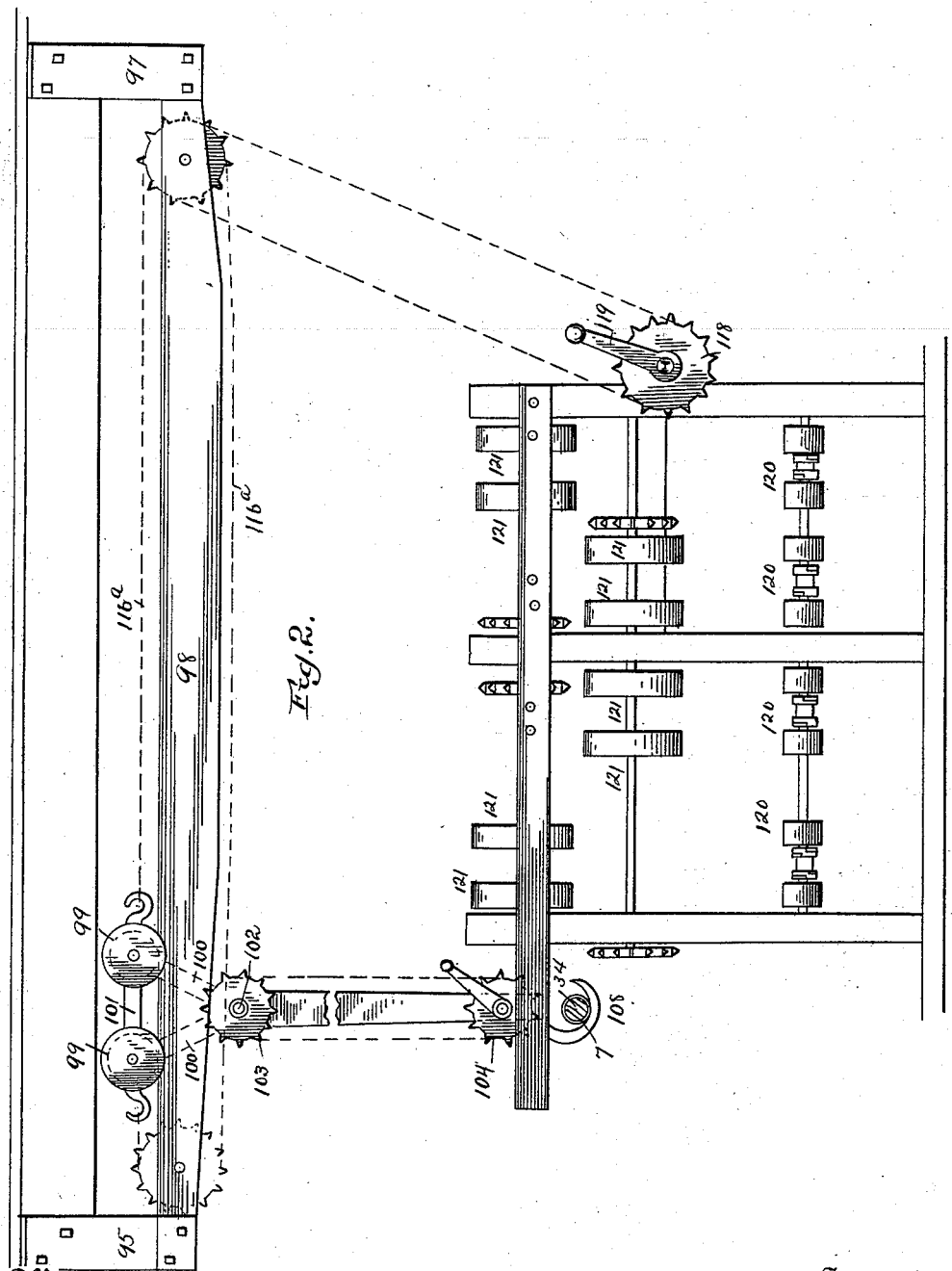

(No Model.) 8 Sheets—Sheet 3.
B. HERSHEY.
HOSE MACHINE.
No. 440,033. Patented Nov. 4, 1890.
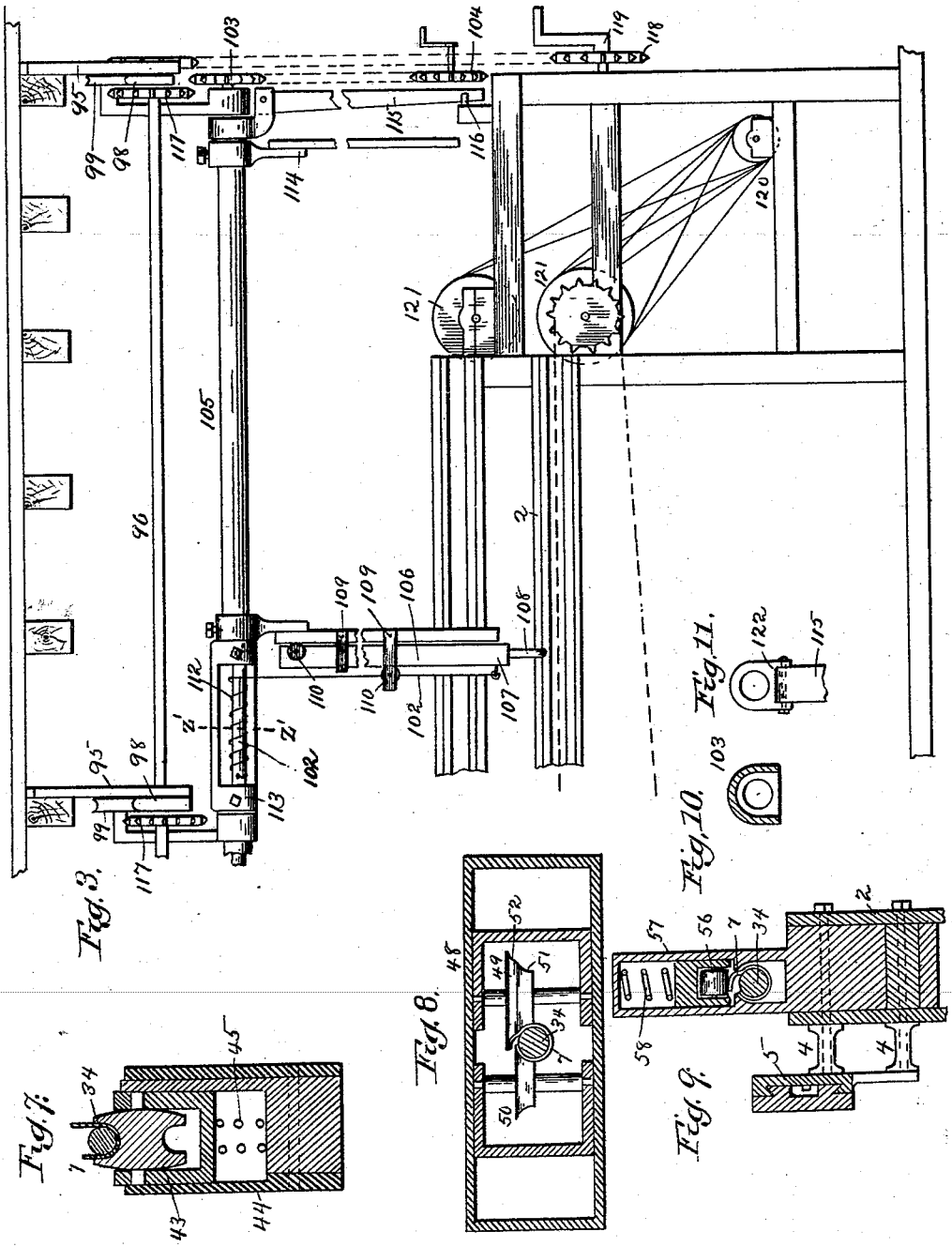
Witnesses
Ira R. Steward
J. G. Meyers Jr.
Inventor
Benjamin Hershey.
By his Attorney
James L. Norris.

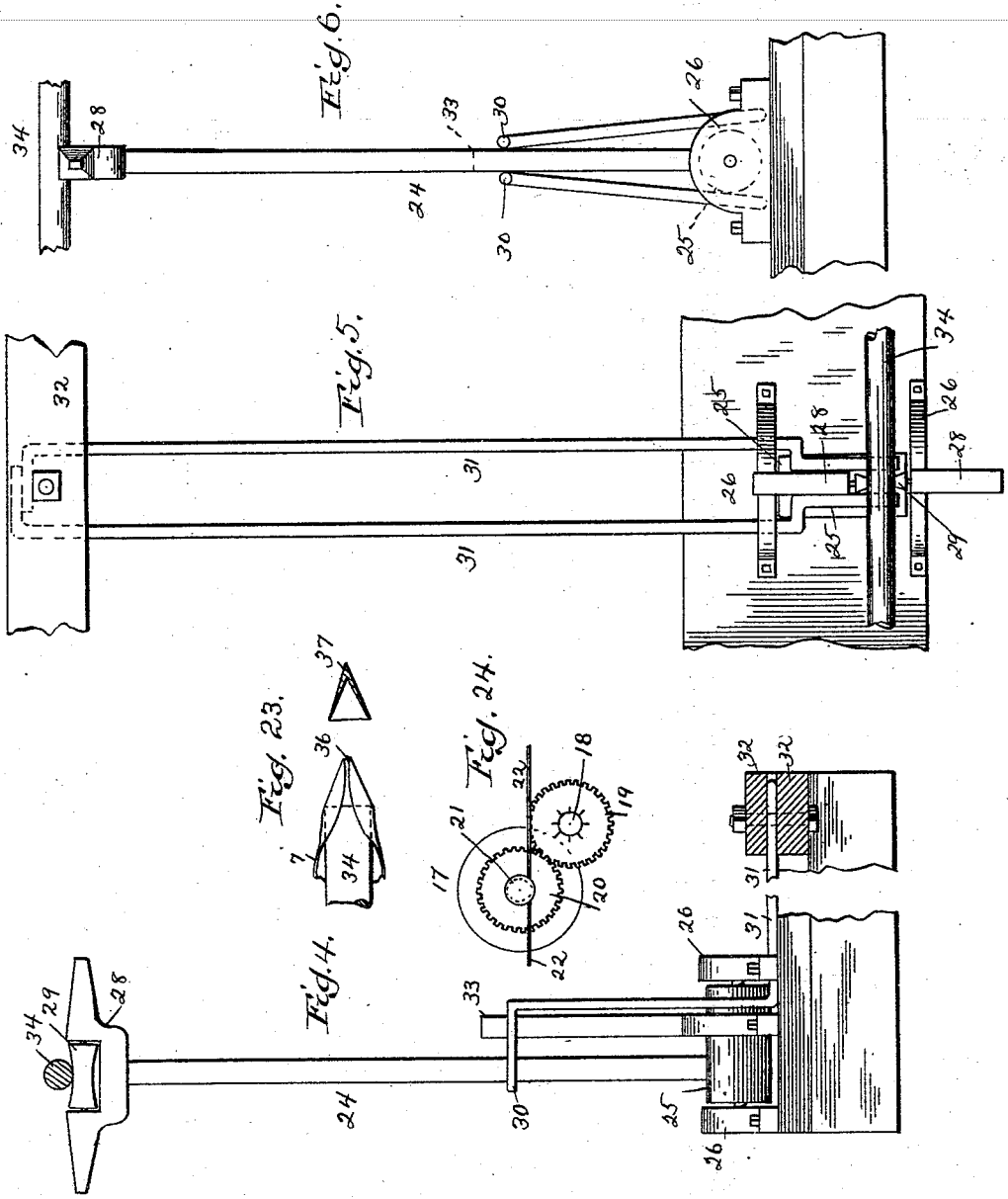

(No Model.) 8 Sheets—Sheet 5.
B. HERSHEY.
HOSE MACHINE.
No. 440,033. Patented Nov. 4, 1890.
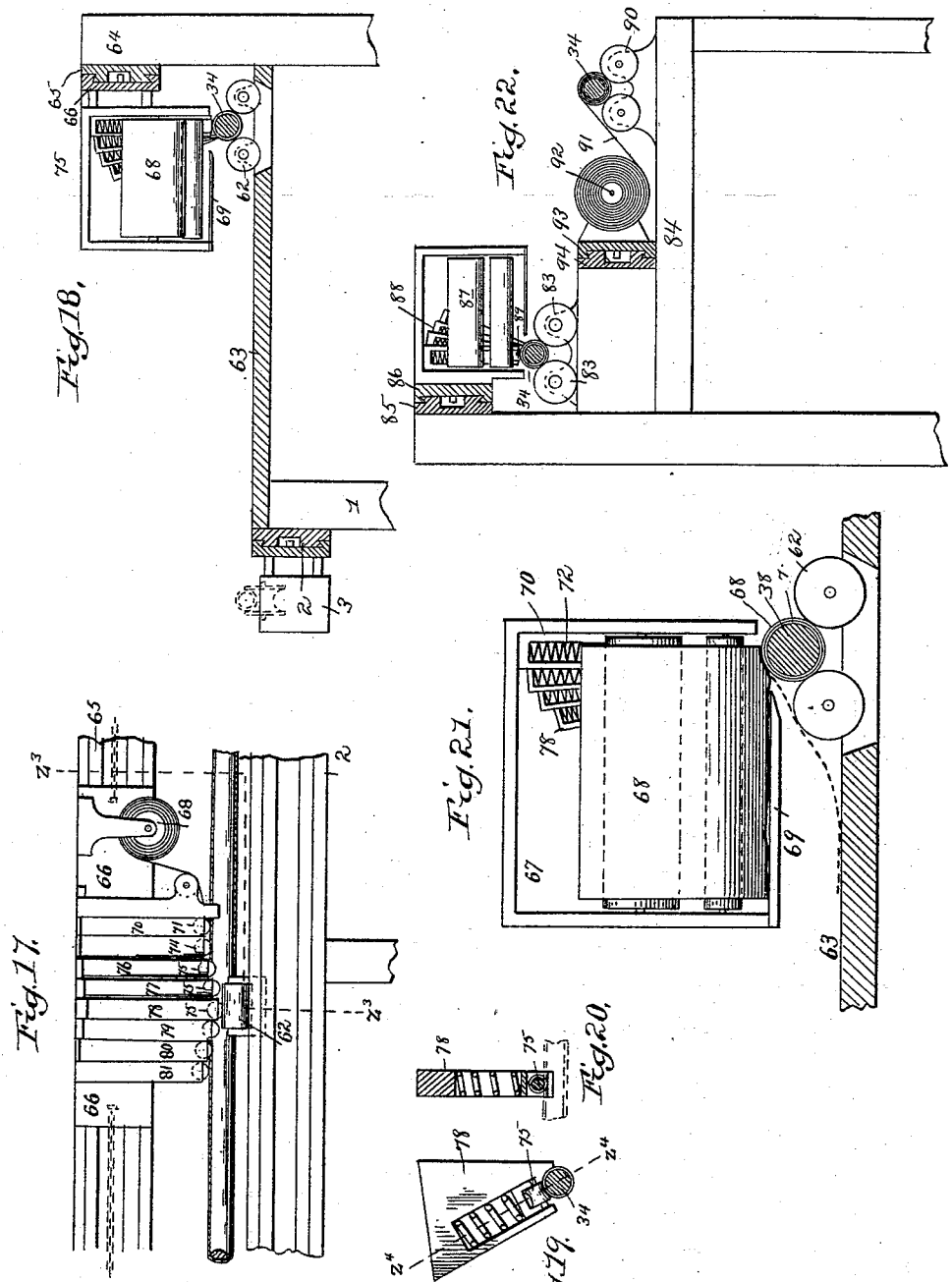

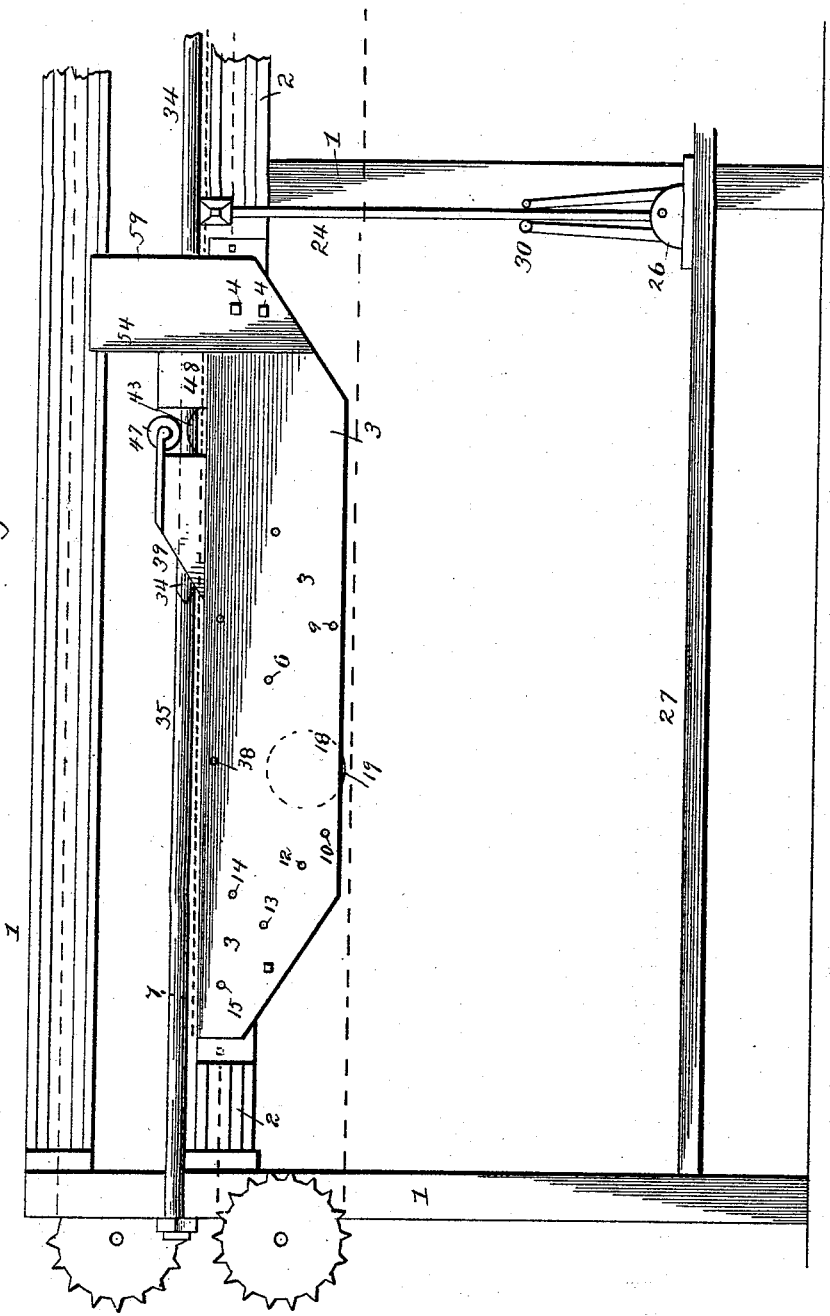

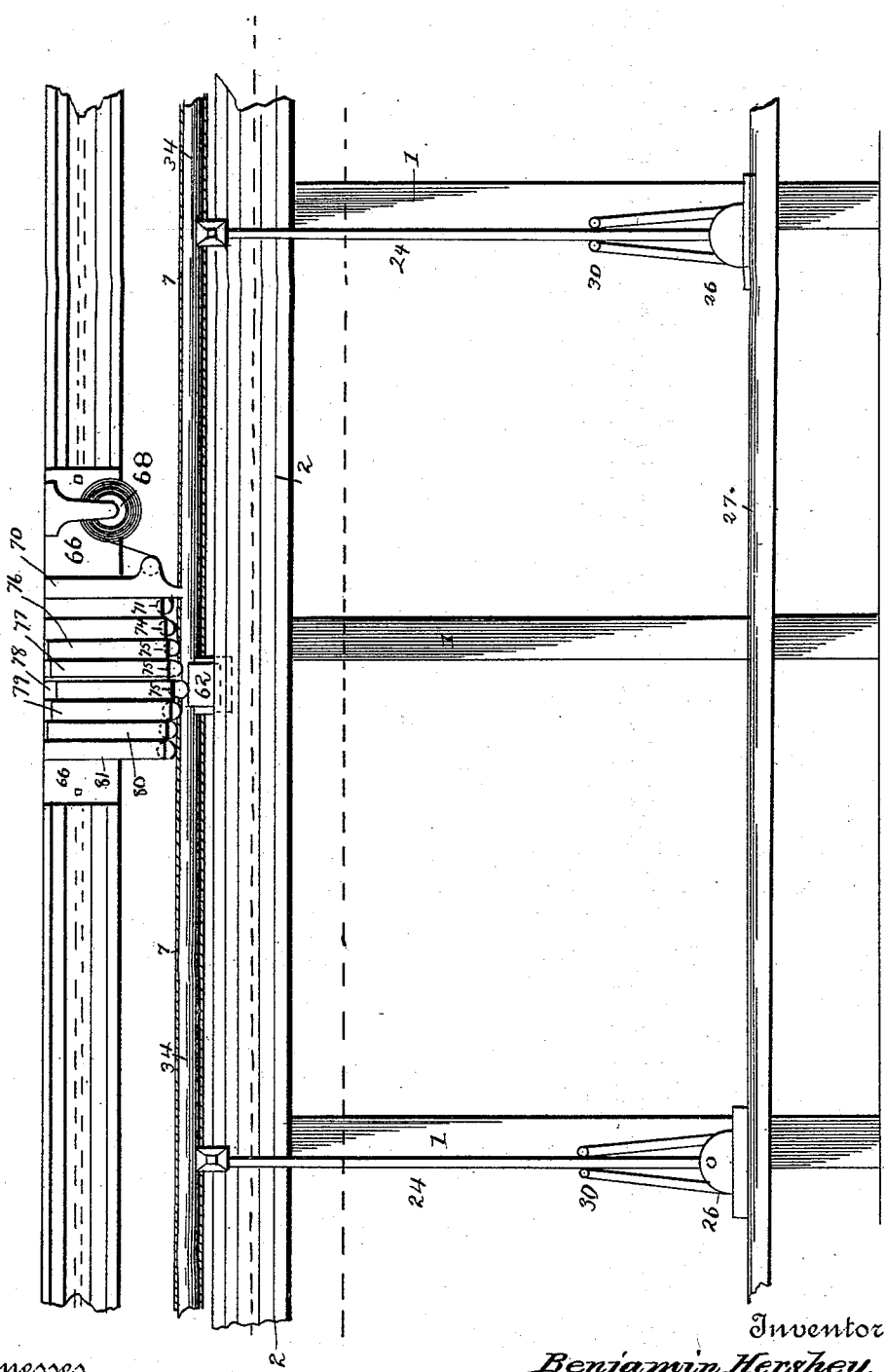

(No Model.) 8 Sheets—Sheet 8.

B. HERSHEY.
HOSE MACHINE.

No. 440,033. Patented Nov. 4, 1890.

Witnesses
Ira R. Steward
J. G. Meyers Jr.

Inventor
Benjamin Hershey,
By
James L. Norris.
Attorney

UNITED STATES PATENT OFFICE.

BENJAMIN HERSHEY, OF ERIE, PENNSYLVANIA, ASSIGNOR OF ONE-HALF TO MARIUS DUVALL, OF SAME PLACE.

HOSE-MACHINE.

SPECIFICATION forming part of Letters Patent No. 440,033, dated November 4, 1890.

Application filed March 20, 1890. Serial No. 344,612. (No model.)

*To all whom it may concern:*

Be it known that I, BENJAMIN HERSHEY, a citizen of the United States, residing at Erie, in the county of Erie and State of Pennsylvania, have invented new and useful Improvements in Machines for Manufacturing Canvas-Rubber Hose, of which the following is a specification.

My invention relates to mechanism for the manufacture of what is generally known as "canvas-rubber hose."

It is the purpose of said invention to provide mechanism having substantially automatic action, whereby I can rapidly unreel a strip of rubber, deposit it accurately upon suitable supports, and wrap or form it in sections of suitable length upon a core-rod or mandrel, whereby the proper form and caliber or diameter is given to the hose, the edges of the strip being lapped and caused to adhere, to form a tubular section of rubber hose.

It is my purpose, also, to provide mechanism whereby the several operations heretofore practiced by hand in the manufacture of rubber hose or canvas-rubber hose may be automatically performed, or largely so, the rubber tube being formed upon the mandrel or core-rod in such manner that its edges may be lapped one upon the other and caused to adhere and the canvas covering applied to the rubber tube, the entire operation of forming and covering the rubber being accomplished mechanically.

It is a further purpose of my invention to provide means whereby the core-rod or mandrel may be lifted and put in place for the initial operation in the formation of the hose, and moved successively or step by step from point to point upon the several mechanical supports provided therefor until it is at last deposited upon a tube-carriage to be conveyed into the vulcanizing-chamber.

It is one object of my invention, also, to provide mechanism whereby the rubber strip which is clothed upon the mandrel or core-rod may be laid upon suitable supports by the longitudinal movement of a bolt and roller-carriage driven in one direction, and whereby said strip may, by the reverse movement of said carriage, be formed upon the core-rod or mandrel and caused to assume an approximately tubular form, one edge being brought into position for overlapping the other edge, means being provided for imparting the necessary adhesion upon the contacting edges.

My invention also comprises the provision of means whereby the rubber strip may be unreeled, the liner removed, the strip extended, the core-rod or mandrel laid thereon, the end of the strip secured thereto, and the rubber then formed upon the core-rod and its edges lapped and united, the whole being accomplished by automatic mechanism.

It is my purpose, also, to provide simple means whereby a non-adhesive coating may be applied to the rubber strip which is formed about the core-rod or mandrel to prevent sticking, a marginal portion being left, to which a solvent is applied to soften the rubber, and provide for the adhesion of the lap and the formation of the tube.

Referring to the accompanying drawings, Figure 1 is a front elevation, partly in section, showing the roller-carriage, the means for propelling the same, and one of the supports for the rubber strip and the core-rod or mandrel. Fig. 2 is an end elevation of the grappling or carrying mechanism, showing also the power-shaft and the separate driven shafts. Fig. 3 is a view showing the construction of the hoisting mechanism, together with one of the grapples of the lever, whereby the latter are brought into and out of engagement with the core-rod or mandrel. Fig. 4 is a detail end elevation of one of the standards and the sustaining torsion-springs by which the vertical position of said standard is preserved. Fig. 5 is a plan view of the parts shown in Fig. 4, the core-rod being represented in both figures. Fig. 6 is a front elevation of the standard shown in Fig. 4, a fractional portion of the rod being shown supported thereon. Fig. 7 is a transverse section of the roller-carriage on the line $x\ x$, Fig. 1. Fig. 8 is a vertical section on the line $y\ y$, Fig. 1, showing that portion of the roller-carriage supporting the lapping-rolls. Fig. 9 is a transverse section upon the line $z\ z$ of Fig. 1, showing the arrangement of the sticking-roll and a section of the rail upon which the bolt and roller carriage travels. Fig. 10 is a detail transverse section of the yoke-coupling mounted upon the shaft operating the grapple, the section being taken upon the line $z' z'$, Fig. 3. Fig. 11 is a detail view showing part of the lever operating the grapples. Fig. 12 is a detail front elevation of the forming-box, which constitutes part of the roller-carriage. Fig. 13 is a detail rear elevation of the same. Fig. 14 is a detail vertical section taken centrally with relation to the opening and longitudinally through said forming-box. Fig. 15 is a detail side elevation of the forming and retaining sheath forming part of the roller-carriage and provided with a plain-faced sticking-roll and a grooved fastening-roll. Fig. 16 is an end elevation of the sheath shown in Fig. 15. Fig. 17 is a front elevation of the roller-carriage by which the canvas covering of one, two, or more plies is laid and applied to the rubber tube. Fig. 18 is a transverse section upon the line $z^3 z^3$ of Fig. 17, the section also including the bolt-carriage which lays the rubber strip, and showing also the finger-forming part of said carriage, whereby the marginal adhesion of the canvas is effected in the axial line of the rubber core. Fig. 19 is a detail section taken transversely through one of the roller-frames on the carriage by which the canvas strip or covering is attached. Fig. 20 is a sectional detail taken on the line $z^4 z^4$ of Fig. 19. Fig. 21 is a transverse section, on an enlarged scale, showing the roller-carriage by which the canvas covering of one or more plies is laid and applied to the rubber tube, said figure also showing the function of the supporting-finger in carrying the canvas wrapping until its marginal adhesion is effected and then laying it upon the table in readiness to be wrapped upon the rubber core. Fig. 22 is a transverse section showing the tube-finishing and jacketing table and the spiral-wrapping table. Fig. 23 is a detail section showing the construction of the ferrule or thimble by which the end of the rubber strip is secured to the point of the core-rod or mandrel preparatory to the formation of the tubular section of rubber hose. Fig. 24 is a detail view showing the gearing connecting the soapstone-roller shaft with the stirrer-shaft and a part of the cord carried around the small pulley on the shaft of the soapstone-roll, whereby rotation is imparted as the bolt-roller carriage moves. Figs. 25, 25$^a$, and 25$^b$ represent when arranged in sequence a side elevation of the entire machine.

In the drawings accompanying this specification, the reference-numeral 1 denotes the frame in which the essential operative parts have support. This frame or support consists, substantially, of a table or bench having a length somewhat in excess of the usual length of the sections of hose as ordinarily manufactured, which is about fifty feet, this being the standard commercial length. Upon this table or frame at or near its edge is formed a rail 2, extending the entire length of said table and having a clearance at each end which is somewhat in excess of the length of roller-carriage hereinafter to be described, whereby a clear space is preserved equal to the entire length of the section of hose to be formed. Upon this rail 2, which is dovetailed in cross-section, is mounted a carriage 3, which I term the "bolt and roller carriage." This device consists, primarily, of a box or casing supported by bolts 4, which unite it with one or more slides 5, moving upon the rail 2. Within the interior of the carriage is contained upon any suitable journal-supports a roll 6, containing a bolt or strip of rubber of proper quality and having such width that when longitudinally wrapped about a core-rod or mandrel it may form a hose-section of ordinary commercial length, the width of the rubber strip being such that it may surround the core-rod and leave a marginal lap for the union of the edges, as hereinafter fully described.

The rubber strip 7, taken from the bolt-roll 6, is carried over a guide-roll 8, arranged transversely across the carriage. Thence it is carried down and under a second guide-roll 9, passing beneath the apparatus by which the soapstone is applied, under a third guide-roller 10, and then over a fifth guide-roll 12, at which point the "liner," as it is commonly termed, being the thin strip of muslin applied to the rubber to prevent adhesion, is removed and carried out of the box of the carriage as fast as the rubber travels, being afterward disposed of in any suitable manner. The strip is then led between a further roll 13 and a solvent-roll 14, by which a suitable coating of some suitable solvent for rubber is applied to its lap, and finally passes over a guide-roll 15 and out of the end of the carriage, its extremity being secured in any suitable way to the end of the frame. As the application of the soapstone is the first step in the process of formation, the apparatus for that purpose will be first described.

Located immediately above the rubber strip as it passes under the rolls 9 and 10 is a box or casing 16, within which rotates a roll 17, its width being equal to that portion of the rubber to which the soapstone is applied, or, in other words, a little less than the entire width of the said strip, in order to give a lap or marginal overlay to form the joint. Upon the side next to the bolt-roll the roll 17 projects through a cut or slot in the side of the box, its edge lying substantially in the plane of the axes of the two guide-rolls 8 and 9.

Within the box 16 is placed a suitable quantity of pulverized soapstone, within which revolves a stirring-roll 18, having stirrers projecting radially from its surface. Upon the end of this latter roll, projecting through the farther side of the carriage in Fig. 1, is a gear-wheel 19, which meshes with a gear 20 on the corresponding end of the shaft of the roll 17. Forming part of the gear 20 is a grooved roll or pulley 21, actuated by a cord or belt 22, rigidly fastened at its ends and carried once around the pulley 21 in such direction that as the carriage moves in the direction of the arrow in Fig. 1 the roll 17 will turn in the direction of movement of the rubber strip, but with a speed slightly greater than that of the rubber. A scraper 23 is mounted on the box to remove the surplus powder and give a substantially uniform coat.

Along the length of the rail 2 at suitable intervals are arranged a series of vertical standards, each consisting of a bar 24, mounted upon a rock-shaft 25, which is journaled between lugs 26, arranged upon a suitable support 27, which is raised from the floor and runs parallel with the rail 2. At their upper ends these standards are provided with a fork 28, in which is journaled a roll 29, the diameter of which diminishes somewhat from the ends toward the center. The standards 27 are of such length that the axes of these rolls will lie substantially in the plane of the rubber strip as it passes off the last roll 15 of the bolt-roller carriage.

Resting against opposite sides of the standards 27 are the bent extremities 30 of torsion-springs 31. These springs have their ends rigidly fastened between two rails 32, rigidly bolted together and forming part of the frame 1. Their torsional portions 31 extend transversely to the rail 2 and pass through openings in one of the lugs 26, beyond which, Fig. 4, they are bent at substantially right angles upward to a suitable point and then outward to form the extremities 30. A rigid post 33, straddling the rock-shaft at its base and rising between the ends 30, serves to center the same and normally preserve the standard in a vertical position.

As the carriage moves in the direction of the arrow in Fig. 1 its forward end, which is beveled off underneath, strikes each standard in succession, swinging it in the direction of movement of said carriage until the latter passes directly over the end thus depressed. As the carriage passes, the standard rises again to a vertical position, and just as it reaches the same the roll 29 receives the rubber strip 7, the movement being continued until a strip equal to the length of the section of hose to be formed has been paid out, received its coating of soapstone or other non-adhesive material and a marginal line of some suitable solvent.

By means of suitable mechanism, which will be fully described hereinafter, an iron core-rod or mandrel 34, fifty feet in length, is now brought over and laid upon the strip as the latter rests upon the rolls 29 of the standards. This core-rod, which has a diameter equal to the caliber of the hose to be formed, is provided at one end with a conical recess, which seats upon the cone-shaped end of a rod 35, permanently fastened at its rear end in the frame 1, and preferably made of wood for the sake of lightness. At the opposite end of the core-rod is formed a conical point 36, around which the end of the rubber strip is lapped closely, after which a thimble 37 is forced over the rubber, the edges of said thimble being slightly beveled off that they may not project beyond the surface of the core-rod. The parts are now in readiness for the retrograde movement or return of the carriage, by which the strip is formed upon the core-rod or mandrel.

Mounted upon and partly within the bolt-roller carriage 3 is a grooved roll 38, which receives the point of the core-rod, to which the rubber strip is attached, and not only supports, but accurately centers said core-rod to enable its point to enter and traverse the forming-box 39, which consists of a block rigidly mounted on the carriage and having an opening 40 extending entirely through the same horizontally. This opening is considerably expanded at the forward end of the block, as shown in Fig. 12, and gradually contracts toward the rearward end, (shown in Fig. 13,) where it is of a size to permit the partly-covered core-rod to pass freely, while the edges of the tubular strip, which are gradually raised by the convergence of the said opening, pass easily into a long vertical slot 41 to form the lap on one side, and a shorter slot 42 to form the underlay on the other side. Immediately behind the forming-box 39 is a deeply-grooved roll 43, journaled in a frame 44, which is lifted by a spiral or other spring 45, the flanges of the roll being preferably inserted in vertical flanges 46, formed in the rear end of the block. This roll receives the point of the core-rod as it emerges from the rear end of the forming-box and supports and guides it, while at the same time its flanges hold the long and short edges of the rubber which form the lap and underlay in a substantially vertical position, as shown in Fig. 7. A second flanged roll 47 is mounted on the forming-block above the roll 43 and running between the raised edges of the strip to press the core-rod down and hold it firmly and accurately in place.

Upon the carriage 3, just in rear of the rolls 43 and 47, is mounted a frame 48, (shown in Fig. 8,) in which are journaled the lapping and underlaying rolls 49 and 50, each being a roll of a single flange only. The flange of the underlaying-roll is concaved upon a curve concentric to the core-rod, while the lapping-roll is provided with a double concave, one of which 51 draws the lap partly down upon the core-rod and nearly up to the edge of the underlay, while the second concave 52 draws the remaining portion immediately over but not against the underlay, this being accomplished by devices now to be described.

Forming part of the frame 48 is a lap-turner 53, (shown in Fig. 15,) consisting, essentially, of a sheet-metal sheath, which receives the covered core-rod, its edges being slightly flanged outward for this purpose, said sheath having an overhanging lip 55, which takes the lap from the second concave 52 of the lapping-roll 49 and draws it down upon or nearly upon the underlay. Immediately in rear of this lip is a sticking-roll 56, which is journaled in a frame or housing 57, having a double compartment in one of which said sticking-roll is journaled in a movable bearing, which is thrown downward by a moderately-light spring 58. This roll has a flat face, and the tension of the spring is such as to give a light but perfect adhesion of the lap upon the outer surface of the underlay. Just behind this plain-faced roll and in the second compartment of the frame 57 is journaled in a movable frame 59 a second roll 60, which is deeply grooved, and is thrown downward by a spring 61 of stronger tension, whereby the lap is tightly drawn down and a perfect joint formed over the whole face of the underlay, making a perfect joint throughout the entire extent of the hose-section. By the several instrumentalities described it will be seen that the rubber strip is extended, coated, save as to its margin or overlay, with soapstone or other non-adhesive material to render it capable of receiving the solvent charged as to the lay or overlay, with such solvent formed upon the core-rod and the lap-joint completed, the whole operation being effected by substantially automatic devices.

The next step in the process of formation is to apply the canvas re-enforce of one or more plies. To effect this, the core-rod, with the rubber core formed thereon, is lifted by mechanism which will be hereinafter described and carried to a series of bearing-rolls 62, arranged upon the table 63 in rear of the rail 2, the axes of said bearing-rolls being parallel with the axis of the core-rod and giving support thereto at short intervals throughout its length. Upon a vertical series of prolongations 64 of the frame 1 is mounted a dovetailed rail 65, upon which is movably supported a carrier 66, fitting said rail and sustaining a box or carriage 67, within which is journaled the roll carrying the canvas bolt 68, said roll being arranged transversely to the axis of the core-rod, as shown in Figs. 17, 18, and 21. Upon the lower part of this carriage is a finger 69, parallel with the axis of the bolt-roller 68 and extending in nearly to the covered core-rod in order to give support to the strip of canvas until its marginal overlay is united with the rubber covering. The frame box or carriage 67 is caused to travel upon the rail 65 from end to end of the core-rod, and the arrangement of parts is such that as it thus moves it will pay off the canvas strip and lay one edge thereof directly upon the rubber covering, while the unattached portion simply drops upon the table 63 after this adhesion is effected and after it has been drawn over the finger 69 to insure a direct longitudinal adhesion of its margin.

Within the box or covering 67 are arranged a series of independent frames, of which the first 70 is either substantially vertical or provided with a vertical chamber, within which is arranged the bearing carrying a spring-pressed roll 71, journaled in suitable supports and driven downward by a spring 72, coiled within the frame, this roll giving sufficient pressure to secure the adhesion of the moistened strip of canvas to the rubber covering. The next succeeding frame 73 is inclined at the same angle or provided with a chamber containing a bearing for a second and similar roll 74, impelled by a spring, by which it is driven against that portion of the canvas which must next adhere in order to form a complete envelope. The roll 74 may be slightly grooved. The third frame 76 is still farther inclined and similarly equipped and the fourth frame 77 stands at a farther, and the fifth frame 78 at the maximum inclination, each having a similar spring-pressed grooved roll 75 bearing upon the canvas. Upon the other side of the fifth frame 78 are three similar frames 79, 80, and 81, which recede toward the vertical, their angles being such as to cause the rolls carried by said frames to travel upon the lines intermediate of the contact lines formed by the first five of said frames.

After the carriage 67 has traveled from end to end of the rail 65, making the attachment of the canvas strip and giving adhesion thereof to the rubber throughout as many degrees of arc as may correspond with the maximum inclination of the fifth frame 78, the core-rod is given a partial revolution to draw another portion of the canvas re-enforce upon the rubber core. The carriage is then given a retrograde movement, whereby the action of the rolls effecting the adhesion is repeated, this action being continued until the canvas is wrapped as far or in as many plies as may be required. The adhesion of the canvas to the rubber is facilitated by merely wetting the canvas. The hose-section is now ready to receive its outer layer of rubber, and for this purpose it is conveyed, together with the core-rod, to bearing-rolls 83, arranged upon a raised table 84, said rolls being in all substantial respects the duplicates of the rolls 62. A rail 85 is arranged upon the supports 64, directly opposite the rail 65, and upon the said rail is placed a movable carriage 86, which corresponds in all material respects with the carriage or frame 67, save that it carries a bolt of rubber 87 of suitable width and length. This bolt is laid upon the canvas-covered hose in the same manner that the canvas is laid upon the rubber core. The carriage 86 is provided, also, with inclined frames 88 of the same number and having a like arrangement with those in the carriage 67, said frames having spring-pressed rolls 89, which roll the rubber envelope closely down upon the canvas re-enforce. The construction of these parts being a duplicate of those already described, no further description is necessary.

It only remains now to finish the hose-section under construction by properly covering the same before it is put into the vulcanizing-chamber. The first part of this operation consists in placing a bolt of well-wetted muslin or other similar or suitable textile material upon the canvas-covered rubber core, this application being equivalent to that of the rubber covering already set forth, applied by means of the traveling roller-carriages shown in Figs. 21 and 22. This bolt of wetted muslin is of a length equal to the rubber last laid on and of the same or substantially the same width, and it is laid and applied in the same manner. The wetting of this muslin bolt with water will give all needed adhesions. This muslin strip is called the "jacket," and it is desirable that it be held in place by a spiral wrapping, and for this purpose the hose-section is removed to the bearing-rolls 90, (shown in Fig. 22,) which are substantially similar in construction and operation to the bearing-rolls 62 in Figs. 18 and 21. Here a strip of wet muslin or other suitable fabric 91 of several inches in width is attached at one end, and rotary movement being given to the hose and core-rod this strip is wound spirally thereon. The strip is taken from a bolt-roll 92, mounted on a carriage 93, which travels upon a rail 94, similar in construction to the rail 2. Longitudinal movement is communicated to the carriage 93 to form the spiral winding by a sprocket-chain. The mechanism forming part of the elements now to be described, and the revolution of the covered core-rod is effected by any suitable means—such, for example, as a sprocket and chain or by gearing. After this jacket is wound on, the section of hose is ready to be placed in the vulcanizing-chamber; but as this operation is common to the construction of all hose it requires no further description.

Above the frame 1 and arranged in drop-bearings 95, depending from the ceiling, is a shaft 96, which will extend the length of the table and parallel with the rail 2. Upon the drop-bearings 95 and upon similar bearings 97, arranged at a distance therefrom, are supported rails 98, running transversely to the rail 2 on the table, and upon said rails 98 are grooved wheels 99, having hangers 100, connected to their journals. Upon each rail these wheels are mounted in pairs, as shown in Fig. 2, the wheels being connected by a bar 101, which forms part of the triangular frame composing the hanger 100. In the lower angles of these hangers is mounted a shaft 102, running parallel with the rail 2 and having at its end a sprocket 103, geared by a chain with a sprocket 104, Fig. 3. Surrounding the shaft 102 is a pipe or sleeve 105, which is so mounted thereon as to turn axially in either direction, and upon said pipe are mounted depending grapple-frames 106, consisting of parallel supports, between which is arranged a bar 107, having at its lower end a grappling-hook 108.

The frames 106 are connected by straps 109, within which the bar 107 has longitudinal motion, friction-wheels 110 being provided upon either side. Connected with each bar 107 is a wire or rope 112, which winds upon the shaft 102 to raise the grapple, said shaft being exposed by a yoke 113, (shown in Figs. 3 and 10,) the ends of which catch a bearing on the shaft, while it is cut away between the ends to admit the wire. At the end of the gas-pipe 105 is a lever 114, rigidly mounted on the pipe, by which a partial revolution may be given to swing the grapples outward and away from the core-bed or hose to be handled. A pivoted lever 115 swings into and out of engaging pins 116, the function of the latter being to give steadiness to the lever when the crank of the sprocket-wheel 104 is turned.

The carriage is propelled on the rails 98 by a continuous chain 116, running over sprockets 117 at the opposite ends of the rails, said sprockets and chains being duplicated at each end of the track. Motion is communicated to the carriage through a sprocket and chain 118 in bearings on the table or frame and rotated by a crank 119. The purpose of these grapples is to lift and remove the core-rod from place to place by mechanical power during the process of manufacture.

Power is derived from a group of pulleys 120, arranged beneath the end of the frame 1 and belted to a double series of pulleys 121, arranged in different planes at the end of the table. I have not shown the belting specifically, for the reason that it is obvious to every mechanic how the parts should be arranged. The locking-lever holding the pipe by which the grapples are swung is pivoted in the fork of a clamp 122, rigidly mounted on the end of the pipe.

The operation of the main portions of the machine has already been described. In using the grapples they are lowered until the hooks can secure a hold under the core-rod, and the carriage is moved upon the rails 98 to the proper point. After hooking to the rod the shaft 102 is revolved until the grapples are raised to the proper height, and the carriage is then moved until the rod can be deposited upon the standards or at such other point as the stage of the manufacture may require. The grapples may then be swung out of the way in any manner already described.

The sprocket-chains by which the bolt-roller carriage and the carriages 67 and 86 are moved are led into grooves in the rails and attached to pins projecting from the back of the slides on which the carriages are mounted, as shown in Figs. 17, 18, and 22.

What I claim is—

1. In an apparatus for forming a section of canvas-rubber hose, the combination, with a support, of a bolt-roller carriage adapted to travel thereon and having a bolt-roll arranged therein which is adapted to unreel a strip of rubber as the carriage moves, said carriage having also a driven roll which applies a non-adhesive material to the rubber, and provided also with a roll adapted to apply a solvent to the lap, and a series of spring-erected standards having supports for said rubber strip, these standards being arranged at suitable intervals in the line of travel of the bolt-roller carriage, substantially as described.

2. In a machine for forming a section of canvas-rubber hose, the combination, with a horizontal support, of a bolt-roller carriage movable on the support and having a bolt-roll carried thereby to receive a strip of rubber, said carriage being also provided with a driven soapstone roller adapted to apply a non-adhesive coating to the face of the strip excepting the lap, which receives a solvent of rubber, a solvent-applying roll upon said carriage, a series of spring-erected standards having upon their ends concave horizontal rolls for receiving the unreeled rubber strip, torsion-springs for erecting said standards, and posts centering the standards in an approximately erect position, substantially as described.

3. In a machine for forming a section of canvas-rubber hose, the combination, with a horizontal support, of a bolt-roller carriage movable on the support and carrying a bolt-roll for receiving a strip of rubber which is unreeled and paid off by the movement of the carriage, the latter being provided with non-adhesive and solvent-applying rolls, a series of spring-erected standards to receive the extended rubber strip, a core-rod or mandrel having a point on which to lap and fasten the end of the rubber, and a forming-box adapted to receive and travel over the core-rod upon the retrograde movement of the carriage to partly form a rubber bolt on the core-rod and raise its edges to different heights to form the lap and underlay, substantially as described.

4. A machine for making canvas-rubber hose, comprising a way or rail, a core-rod, and a carriage adapted to slide on said way or rail and provided with non-adhesive and solvent-applying rolls to act upon a bolt of rubber carried by and unreeled or paid off by the movement of said carriage, in combination with a series of yielding spring-erected standards having supports on which the extended rubber strip is laid, said supports being adapted also to receive the core-rod, a forming-box mounted on said carriage to traverse the core-rod on the retrograde movement of the carriage for partly forming the rubber on the core-rod and raising its edges, lapping and underlaying rolls mounted on the carriage to act on the raised edges of the rubber as it comes from the forming-box, a sheath to turn the lap down, and a plain and a grooved sticking-roll, both spring-pressed and mounted in a frame upon the carriage, substantially as described.

5. In a machine for making canvas-rubber hose, the combination, with a carriage adapted to slide upon a way or rail and provided with a bolt-roll to receive a strip or bolt of rubber which is adapted to be unreeled or paid off by the movement of the carriage, the latter being supplied with non-adhesive and solvent-applying rolls, of a series of spring-erected standards having concave rolls on which the rubber is adapted to be extended, a core-rod supported by the rolls and held at its butt by a holding-rod rigidly mounted on the frame of the machine, a forming-box on the carriage, provided with an expanding opening adapted to receive the core-rod and to raise the edges of the rubber to form the lap and underlay, said forming-box being provided with grooved rolls to hold up the rubber and to guide the core-rod, lapping and underlaying rolls on said carriage to partly complete the formation of the rubber, a sheath on said carriage to turn the lap nearly down, and plain and grooved sticking-rolls carried by the carriage to complete the joint, substantially as described.

6. In a machine for forming canvas-rubber hose, the combination, with a bolt-roller carriage adapted to move upon a slide or way and having journaled therein a bolt-roll to carry a strip of rubber and provided with means for applying a non-adhesive coating to one face of said strip and a solvent to the lap, of a series of standards held erect by torsion-springs for receiving the rubber strip as it is paid off by the movement of the carriage, a core-rod to lay upon the extended strip, a former-box drawn over the rod to partly form the rubber thereon, a lapping and an underlaying roll mounted on and traveling with said carriage, and a plain and a grooved sticking-roll mounted in a frame on said carriage and pressed against the lap by springs, substantially as described.

7. In a machine for forming and covering canvas-rubber hose, the combination, with suitable bearing-rolls sustaining the core-rod, of a traveling carriage moving above said core-rod and carrying a bolt-roll adapted to receive a strip of canvas, a frame in said carriage, having a plain vertically-spring-pressed sticking-roll for giving marginal adhesion to the canvas and provided with a succeeding frame having a vertically-pressed grooved roll, and a series of frames or housings having spring-pressed grooved rolls to act upon the canvas at increasing angles of inclination and provided with another series of similar frames which have rolls acting at gradually-receding angles, substantially as described.

8. In a machine for making canvas-rubber hose, the combination, with suitable bearing-rolls and a core-rod supported by the latter, of a carriage adapted to travel on a rail and having a bolt-roll for carrying a bolt of canvas, the edge of which is laid by the movement of the carriage upon the core, said carriage having a finger to extend horizontally beneath the bolt and nearly to its edge for supporting the canvas as it is laid, and provided with a plain-faced sticking-roll mounted in suitable bearings in said carriage, substantially as described.

9. In a machine for forming and covering canvas-rubber hose, the combination, with bearing-rollers, of a core-rod supported by the latter, means for imparting a rotary movement to the core-rod, a carriage moving parallel with the revolving core-rod and carrying a roll having its axis arranged parallel with the axis of the core-rod to carry a wet strip of muslin, and means for imparting to said carriage a movement parallel with the revolving core-rod to spirally wind the muslin, substantially as described.

10. In a machine for forming and covering canvas-rubber hose, the combination, with a series of standards having supports to receive a rubber strip and mounted on rock-shafts, of parallel torsional springs having their ends bent upward and then outward to engage the opposite sides of the standard, and a centering-post arranged between the ends of said springs, substantially as described.

11. In a machine for forming canvas-rubber hose, the combination, with a horizontally-movable carriage containing a bolt-roll to receive a bolt of rubber and provided with a soapstone roller to revolve in contact with the rubber, of a series of spring-erected standards, a core-rod, a traveling carriage having grapples adapted to slide in parallel depending supports which are rigidly mounted on a hollow shaft or pipe, a shaft supported in hangers and running concentrically through said pipe, said shaft being partly exposed by a yoke, and means for rotating said shaft to wind thereon wires or ropes attached to the sliding grapples to raise and lower the core-rod, substantially as described.

12. In a machine for making canvas-rubber hose, the combination, with a core-rod to rest upon a strip of rubber, of a forming-box having a converging passage for raising the lap and overlay, said carriage supporting the forming-box and having a frame following said box and carrying a lapping and an underlaying roll, a lap-turner following said frame to lay the lap upon the underlay, and sticking-rolls following the lap-turner to complete the joint, substantially as described.

In testimony whereof I have affixed my signature in presence of two witnesses.

BENJAMIN HERSHEY.

Witnesses:
JAMES L. NORRIS,
JAMES K. RUTHERFORD.